Aug. 3, 1943.  C. W. HOLTMAN  2,325,956
DEVICE FOR PREVENTING BACK FLOW IN LIQUID CARRYING LINES
Filed Dec. 6, 1939
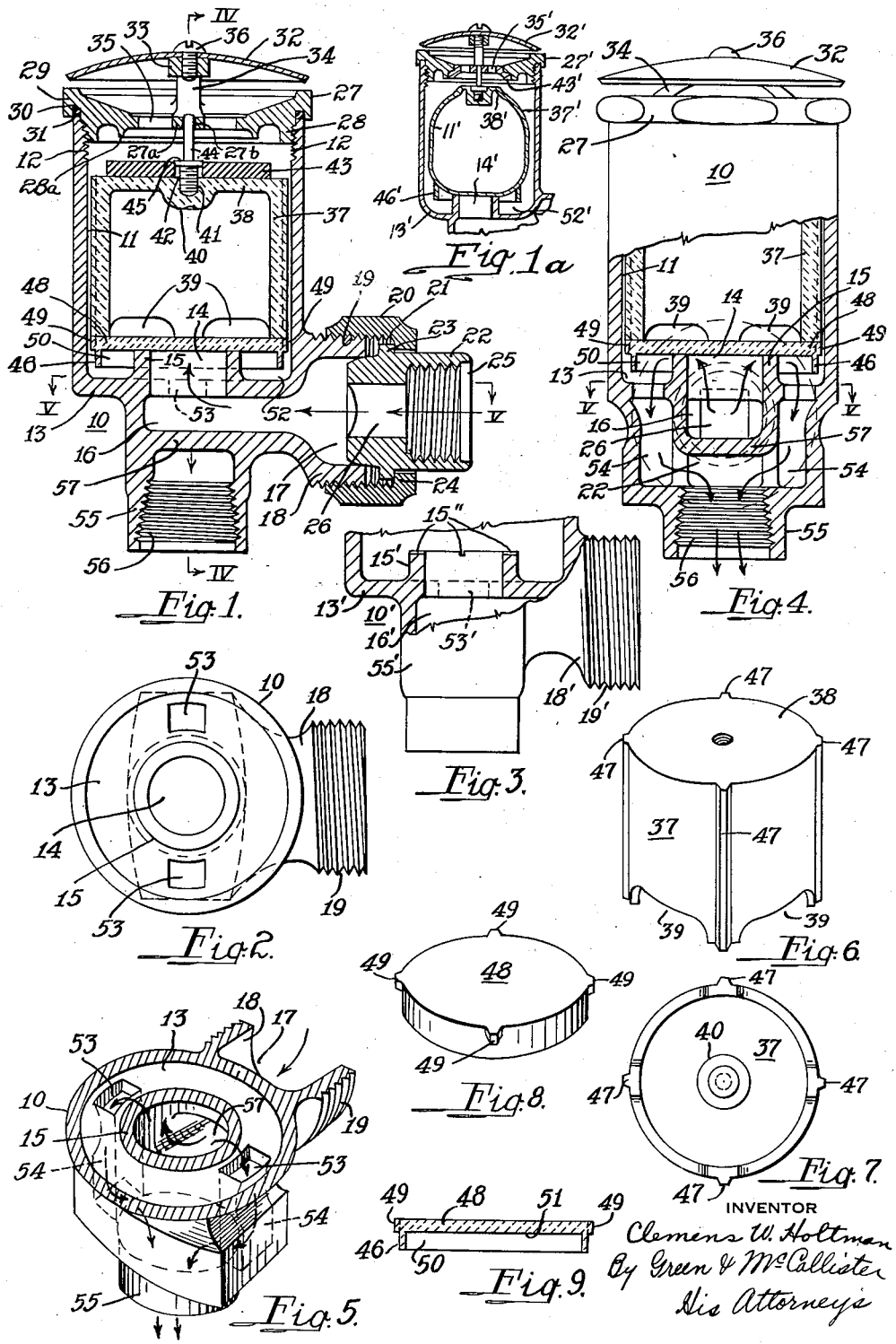
INVENTOR
Clemens W. Holtman
By Green & McCallister
His Attorneys Patented Aug. 3, 1943

2,325,956

UNITED STATES PATENT OFFICE 2,325,956

DEVICE FOR PREVENTING BACKFLOW IN LIQUID-CARRYING LINES

Clemens W. Holtman, Louisville, Ky., assignor to American Radiator & Standard Sanitary Corporation, a corporation of Delaware Application December 6, 1939, Serial No. 307,818

4 Claims. (Cl. 137—69)

The present invention relates to control devices adapted to be inserted in a liquid-carrying line or pipe on the discharge side of a control fixture such as a faucet or valve and between such and a sanitary fixture, to prevent a back flow from such sanitary fixture into such line or pipe.

For sanitary and other reasons, it is necessary to provide some means to prevent back flow or flow reversal from sanitary fixtures into service or supply water lines. For example, sinks and water closets are frequently connected into the same water line, and means must be provided which would prevent any possibility that the flow of water to the sink will be contaminated. Likewise, in other connections it is often desirable to preclude undesirable admixture or contamination of liquids in supply and service lines and here too the necessity for a simple, dependable device is apparent. This is particularly true in connection with hospital fixtures to which this invention is directed. While back flow preventers, so-called, are known and presumably used to some extent, such have not generally been thoroughly dependable under all conditions of operation, particularly when the water supply is under very low pressure, when the supply valve is only partially opened, or when certain back-pressure conditions prevail along with partial supply valve opening or low supply pressures, under which circumstances spillage of water through the air port has been possible.

One of the objects of the present invention is to provide a device for preventing back flow in water service and supply lines which is simple and highly effective under all anticipated conditions of operation or use.

Another object of the invention resides in the provision of a device which can be interposed on the discharge side of any valve, discharge or control fixture in a water or other supply or service line, which is not subject to deterioration from corrosion and other detrimental agencies and which can be repaired or replaced when necessary at minimum expense and with unusual accessibility of parts.

The incorporation of an auxiliary open bottom float, with a loose valve disc working therewith, in a double acting type check is novel and useful and constitutes a further object of this invention.

A still further object of the invention lies in the provision of a device for preventing back flow wherein abnormal conditions actuate the device to preclude the possibility of insanitary contamination.

Other and further objects and advantages reside in the various structural combinations, subcombinations and details hereinafter described and claimed and in such other and further matters as will be understood by those skilled in this art. An optional feature of the invention includes the provision of means for breaking a vacuum which may form in the supply line under some conditions.

In the accompanying drawing wherein I have illustrated one operative embodiment of the present invention:

Figure 1 is a vertical medial sectional view taken through a device responding to the present invention;

Fig. 1a is a fragmentary view similar to Fig. 1 of a modified float assembly;

Fig. 2 is a plan view of the body member of Fig. 3;

Fig. 3 is a fragmentary sectional view of the body member alone modified for vacuum breaking purposes;

Fig. 4 is a view at 90° to Fig. 1, partly in section and partly in elevation, and taken on the line IV—IV of Fig. 1;

Fig. 5 is in part a perspective and in part a sectional view of the lower portion of the present device and taken substantially on line V—V of Figs. 1 and 4;

Fig. 6 is a perspective view of the bottomless non-metallic float employed in the device of the present invention;

Fig. 7 is a bottom view of the float of Fig. 6;

Fig. 8 is a perspective view of a disc utilized with the float of Fig. 6; and

Fig. 9 is a sectional view of the float disc of Fig. 8.

Similar numerals designate corresponding parts throughout the various views of the drawing.

Referring to the drawing, it will be apparent that the present device includes a generally hollow and more or less cylindrical body member 10. The construction is such as to provide a float chamber 11 in the upper portion of the body which is adapted to receive the float assembly hereinafter described. Interiorly, the upper end of the float chamber is provided with threads 12 which are adapted to receive the cap assembly hereinafter described.

Centrally located in the bottom 13 of the upper portion of the body member, i. e., the bottom of the float chamber 11, and communicating with the float chamber is an opening 14 defined by the annular upstanding flange 15 which rises from the bottom 13 aforesaid. This opening 14 communicates with a chamber 16 therebelow and laterally communicating with and forming an extension of the last chamber is an inlet opening 17, formed in the lateral hollow body extension 18. This body extension flares outwardly, as shown, so that opening 17 is larger than chamber 16 and is exteriorly threaded at 19 for the reception of a swivel nut 20 which is interiorly threaded at 21, as shown. A swivel 22 cooperates with the body extension 18 and the swivel nut 20, as shown, and is of generally circular or cylindrical construction provided with an external annular projection 23 which cooperates with the inturned terminal flange 24 of the swivel nut 20. The swivel is hollow, being provided with an interiorly threaded passageway 25 which merges into the reduced bore 26 at the inner end thereof, this reduced bore communicating with the chamber 16. It will be clear that the structure just described enables the present device to be connected into a suitable liquid-carrying line such as a water service or supply pipe but is only intended to illustrate one means of making such a connection. The invention is not in any way limited to this connection.

The cap assembly hereinabove referred to includes a centrally ported cap 27 which has an exteriorly threaded depending skirt or flange 28 adapted to engage the interior threads 12 in the upper end of the body 10. Intermediate this depending flange 28 and the thickened marginal annulus 29 of the cap an inverted annular groove 30 is provided in which is disposed a suitable annular washer 31 composed of appropriate material, such as rubber. This washer, plus the threaded engagement of the cap with the body member provides a fluid-tight joint or connection. An annular valve seat 28a depends, as shown, from the under side of the cap. The cap 27 is provided with a concavo-convex shield member 32. This shield member is maintained over the cap 27, and somewhat spaced vertically therefrom, and rests upon the apertured bearing 33 which forms the center of a bowed or semi-elliptic member 34 rising from the cap, on either side of the central opening 35 thereof. A shield screw 36 passes through shield 32 and into bearing 33, thereby maintaining these members in operative assembly. A bridge member 27a extends diametrically across opening 35 and has an aperture 27b therein for a purpose to be explained.

Disposed within the float chamber 11 is a float assembly which includes a float proper 37. This is a bottomless cylinder having a top 38 which forms a closure. The lower end of the cylinder is cut away as shown at 39. The center of the top 38 has a thickened circular portion 40 which is tapped for the reception of a screw or the like 41, which, as shown in Fig. 1, passes through a central opening 42 in the rubber seat washer 43 and thence into the thickened portion 40 aforesaid. The fastening member 41 is preferably provided with a smooth shank extension 44 superjacent the flange 45 the upper end of which extends into aperture 27b of bridge member 27a. The flange 45 serves as a washer and snugly engages seat washer 43 as shown. The float is provided externally with spaced vertical projecting ribs 47 which maintain the same properly centered in the float chamber and provide a communicating passage from the air port to the fluid ports in the lower part of the float chamber between the float and the float chamber wall, and avoid jamming when the float moves upwardly or downwardly. Shank extension 44 works in aperture 27b as the float moves and prevents misalignment or disassembly of the parts, thus ensuring proper operation at all times.

The float assembly is completed by a bottom disc 48. This disc has spaced radial projections 49 similar to those (47) described in connection with float 37. Disc 48 is provided with an annular depending flange or skirt 46 so that the underside thereof presents a chamber 50 into which the upper portion of member 15 projects. The underside 51 of disc 48 rests upon member 15 and this constitutes the lowermost position of disc 48 on the upper side of which the lower edge of float 37 rests, as shown best in Fig. 1, forming in effect a bottom for said float adapted to actuate the same upwardly when the buoyancy of the jet passing through inlet opening 14 is adequate so to do. This will be more fully understood in connection with the subsequent description of the operation of the device.

Attention is directed to the relatively high inlet seat due to the height of flange 15 and to the use of a skirted float disc. These constitute important and valuable features of my invention. The arrangement noted modifies the turbulence characteristics of the device and makes it practically impossible for the air normally trapped within the float to be aspirated even under highly unusual conditions. Any displacement of such air by liquid would correspondingly reduce the buoyancy of the float temporarily and to that extent would impair the operation of the device. When constructed in accordance with my invention the air port 35 is always sealed or closed prior to a rise of liquid to a level high enough to permit it to flow out through such air port; hence, leakage at this point is impossible.

Both the float 37 and the float disc 48 are preferably made of Bakelite or from other non-metallic or resinous material but may be composed of any suitable material resistant to corrosion and light enough to respond to conditions as herein set forth. The other portions of the device are preferably composed of a suitable metal or alloy such as brass, although it is to be understood that the particular composition of any part of the present device is not intended to constitute a limitation upon this invention, as any material may be employed which is satisfactory for any particular use, due regard being given to the nature of the fluids to contact with which the device may be subjected.

The trough-like portion 52 in the bottom 13 of the float chamber 11 is also provided with one or more outlet openings 53, two diametrically oppositely disposed openings being shown for exemplary purposes as this particular arrangement forms one desirable embodiment of the invention. These outlet openings communicate via outlet passageways 54 with the outlet extension 55 which is preferably of somewhat reduced size as compared with the upper portion of the body 10. This outlet extension is understood as being adapted to be connected into a suitable liquid carrying line. As illustrated, the outlet extension 55 is in alignment with the float chamber and is internally threaded at 56 to adapt it for engagement with the line mentioned. Lying between outlet extension 55 and the chamber 16 is a partition wall 57 which forms the bottom of chamber 16 and maintains the inlet and outlet passageways separate and distinct. The device when installed is disposed so that it is positioned above the highest level that liquid can attain in the associated fixture so that any gravity flow of liquid will always be in the direction away from the device and toward the fixture.

While the present device is primarily designed to prevent back flow under all possible contingencies, it is also adapted by slight modification to act as a vacuum breaker. Such an arrangement is illustrated in Fig. 3 wherein it will appear that the upper edge of the flange 15' (which constitutes an inlet seat) is provided with small angularly spaced (e. g., 90° apart) grooves 15", this form of the invention being otherwise the same as Fig. 1 as will be noted by the use of similar numerals but with a prime (') suffix. The spaces represented by the grooves 15" form a controlled leak between float chamber 11 and the supply of liquid. Therefore, when negative pressures arise or exist in the supply line air is drawn back into the supply to break the vacuum but at such a rate as will be commensurate with maintaining substantially atmospheric pressure within the float chamber. It will be understood that under such conditions air port 35 is and remains open and that the grooves 15" form a communication between the supply line and the atmosphere. It is to be understood that the vacuum breaking feature is a definite part of this invention but is omitted in the preferred form of the invention.

It will further be appreciated that except during those times when the device is being positively supplied with liquid through the normal inlet port the float and bottom disc are gravitationally positioned so as effectively to close such inlet port and to maintain the air port open, thus ensuring that float chamber 11 be under atmospheric pressure conditions. Since, as previously stated, the device is so positioned with reference to the associated fixture that liquid cannot return to the device by gravity, and since the device so functions as to prevent significantly negative (less than atmospheric) pressures from arising within the float chamber it is not possible for liquid to return from the fixture to the device; consequently, back flow from such fixture is precluded and contamination of the supply line is rendered impossible.

In ordinary use, due to the fact that the device is disposed on the discharge or outlet side of a valve or the like as already mentioned, it will be apparent that fluid will pass through the hollow swivel 22, through the inlet opening 17, the passage 16 and the opening 14, and under normal conditions will cause the float assembly to rise due to the jet action and buoying effect of the incoming fluid until the float assembly reaches an equilibrium position, usually in uppermost position, closing air port 35. Under these conditions, the fluid then passes through the outlet openings 53 and through the outlet extension 55 to the fluid-carrying line or other suitable conduit. Thus, during the existence of normal or predetermined conditions within the float chamber the float assembly closes off the communication of the float chamber with the external atmosphere via the cap assembly, and thus, in effect, the device of the present invention permits normal operation of the fluid line substantially as if the present device were not interposed therein.

It is to be understood that the foregoing is presented as exemplary or illustrative and not as limitative or restrictive, and I may, therefore, make additions, omissions, substitutions and alterations in the device without departing from the scope and principle hereof so long as the same fall within the appended claims. For example, I am not limited to the use of a bottomless float or a float of the particular character above described as I may equally well use a capsule-shaped float 37' of light gauge metal, with a suitable bottom disc subjacent thereto or integral therewith. The bottom of the float itself in such case, in effect, acts to close the opening 14' when the float is in its lowermost position. In such case also the capsule-shaped float will close or seal the opening or air port 35' in cap 27' by rising against it, the opening or port being provided with an annular rubber seat 43' for this purpose. Such construction is illustrated in Fig. 1a. The open-ended type of float is preferred, however, as I have discovered that the same has definite advantages. For example, such a float may be constructed with a very light (thin) section without danger of collapse even under relatively high operating pressures since the external and internal pressures are always balanced. Furthermore, permanent waterlogging is eliminated such as would result when a hollow sealed float develops a leak, however slight. In the design of float shown in Figs. 6 and 7, the cut away portions 39 ensure drainage should liquid gain access to the float cavity. Such drainage will occur when no liquid is entering the device, as when the inlet valve in the supply line is closed. In addition, it is to be understood that while I have illustrated an embodiment of the invention wherein the water or other liquid or fluid enters laterally and passes out through the bottom, this is also subject to variation as the device may equally well accommodate fluid entering from the bottom and passing out through the side. The device may further be so varied as to change the angular relationships between the various parts of the body member; that is to say, the inlet and outlet extensions need not be at right angles to each other, the inlet extension need not be at right angles to the body and the outlet extension need not be a straight angle with the body. Other angular relationships may be equally well employed, depending upon the particular installation as well as the space requirements and limitations of such installation. The inlet should, however, be below the float chamber or so related as to obtain the jet action above mentioned. While the device is especially suitable with hospital fixtures, this is not intended to constitute a limitation on the invention which is useful in many other places wherever the principles hereof apply and, in general, may be employed in conjunction with any waste disposal fixture whether used for medical, domestic or industrial purposes. Rather the invention is to be defined by the appended claims which cover all those forms of the invention which employ a movable member having buoyancy characteristics such as to effect a primary and effective seal and to ensure complete freedom of leakage of liquid through an air port under all possible conditions of positive liquid supply to the device.

Having thus described my invention, what I claim as new and desire to secure by Letters Patent is:

1. A device for preventing back-flow in a liquid-carrying line which comprises a body portion containing a chamber having inlet and outlet openings communicating therewith and having a port to the atmosphere and control members in said chamber capable of gravitational movement to inlet obstructing position under non-buoyant conditions and to port closing position under buoyant flow conditions, said control members including a hollow cylindrical float and a disc disposed entirely below said float and on the annular marginal portion of the upper surface of which said float is adapted to rest, said float being provided with port sealing means including a seat washer and guide means for ensuring movement of the seat washer to its port closing position.

2. A device for preventing back-flow in a liquid-carrying line which comprises a hollow cylindrical body portion provided with a bottom having a central inlet opening and circumferentially spaced outlet openings, a ported cap assembly on the upper end of said body portion, control members in said chamber in the form of a buoyancy-actuated double-acting check valve capable of gravitational movement to inlet-obstructing position under non-buoyant conditions and rising movement to port closing position under buoyant flow conditions, said control members including a hollow cylindrical bottomless float made of non-metallic material and having an external diameter only slightly less than the internal diameter of said body portion, a disc of non-metallic material having a diameter substantially equal to the external diameter of said float and on the annular marginal portion of which said float is adapted to rest, said disc having a depending annular skirt forming with the underside of said disc an arrangement sensitive to buoyancy conditions in said chamber, a raised circular seat around said inlet opening upon which said disc is adapted to rest when in its lowermost portion and said float having structure on its upper end adapted to close said port when said float is in its uppermost portion.

3. A device for preventing back flow in a liquid-carrying line which comprises a hollow cylindrical body portion having a bottom provided with a central circular inlet opening and circumferentially spaced outlet openings, a hollow circular boss surrounding said inlet opening and rising above bottom of said body portion to provide a raised annular inlet seat, a non-metallic disc having a diameter only slightly less than the internal diameter of said body portion and provided with a depending annular skirt near the periphery thereof, said disc being adapted to rest on the raised inlet seat aforesaid when said disc is in its lowermost position, a hollow non-metallic cylindrical float substantially equal in its external diameter to the diameter of said disc and disposed above said disc and adapted to rest upon the annular marginal portion of the upper surface thereof, the top of said float being closed, a ported closure for the top of said body portion and a seat washer on the top of said float adapted to close said port when said float is in its uppermost position.

4. A device for preventing back flow in a liquid-carrying line which comprises a hollow cylindrical body portion having a bottom provided with a central circular inlet opening and circumferentially spaced outlet openings, a hollow circular boss surrounding said inlet opening and rising above bottom of said body portion to provide a raised annular inlet seat, a non-metallic disc having a diameter only slightly less than the internal diameter of said body portion and provided with a depending annular skirt near the periphery thereof, said disc being adapted to rest on the raised inlet seat aforesaid when said disc is in its lowermost position, a hollow non-metallic cylindrical float substantially equal in its external diameter to the diameter of said disc and disposed above said disc and adapted to rest upon the annular marginal portion of the upper surface thereof, the top of said float being closed, a ported closure for the top of said body portion and a seat washer on the top of said float adapted to close said port when said float is in its uppermost position, said float and disc being provided with vertical circumferentially spaced ribs and the said float and disc having a combined vertical extent less than the said body portion whereby said float and disc are capable of upward and downward vertical movement in said body portion in response to buoyancy conditions therein.

CLEMENS W. HOLTMAN.